United States Patent [19]

Geisinger

[11] Patent Number: 5,193,254
[45] Date of Patent: Mar. 16, 1993

[54] VERSATILE SELF-CLINCHING DISPOSABLE RESTRAINTS AND BUNDLING STRAPS

[76] Inventor: George H. Geisinger, 358 Summit Rd., Mountainside, N.J. 07092

[21] Appl. No.: 870,751

[22] Filed: Apr. 20, 1992

Related U.S. Application Data

[63] Continuation of Ser. No. 754,056, Sep. 3, 1991, abandoned.

[51] Int. Cl.$^5$ .............................................. E05B 75/00
[52] U.S. Cl. .................................. 24/484; 24/16 PB; 70/16
[58] Field of Search ............. 24/16 R, 16 PB, 30.5 P, 24/17 AP, 484; 70/15-18

[56] References Cited

U.S. PATENT DOCUMENTS

| | | |
|---|---|---|
| 3,186,047 | 6/1965 | Schwester et al. |
| 3,457,598 | 7/1969 | Mariani |
| 3,973,293 | 8/1976 | Noorily ................... 24/16 PB |
| 4,028,777 | 6/1977 | Schobel et al. ........... 24/16 PB |
| 4,071,023 | 1/1978 | Gregory |
| 4,137,606 | 2/1979 | Wood |
| 4,138,770 | 2/1979 | Burrette et al. .......... 24/16 PB |
| 4,214,349 | 7/1980 | Munch |
| 4,263,697 | 4/1981 | Speedie |
| 4,473,524 | 9/1984 | Paradis |
| 4,573,242 | 3/1986 | Lankton et al. .......... 24/16 PB |
| 4,788,751 | 12/1988 | Shely et al. ............. 24/16 PB |
| 4,788,752 | 12/1988 | Kraus et al. |
| 4,862,560 | 9/1989 | Lichtenberg |
| 4,862,561 | 9/1989 | Lichtenberg |
| 4,910,831 | 3/1990 | Bingold |
| 4,964,419 | 10/1990 | Karriker |
| 5,031,943 | 7/1991 | Scott ................... 24/16 PB X |

Primary Examiner—James R. Brittain
Attorney, Agent, or Firm—Mathews, Woodbridge & Collins

[57] ABSTRACT

A self-clinching disposable restraint or bundling strap having a locking head with a primary bore passing through the thickness of the head into which the tip of the tape is inserted and pulled through for locking. Two rows of ratchet teeth are provided on the upper surface of the tape. A front surface of the ratchet teeth forms an acute angle with the perpendicular axis of the ratchet teeth. A pair of cantilever pawls have a tip portion to exactly fit and successively engage each of the ratchet teeth as the tape is pulled through the locking head. A finger hole in the tape near the tip enables the user to readily pull the tape through the locking head.

8 Claims, 5 Drawing Sheets

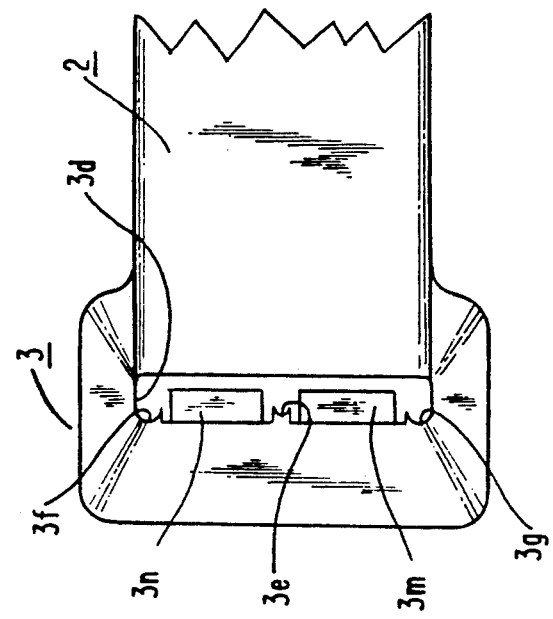
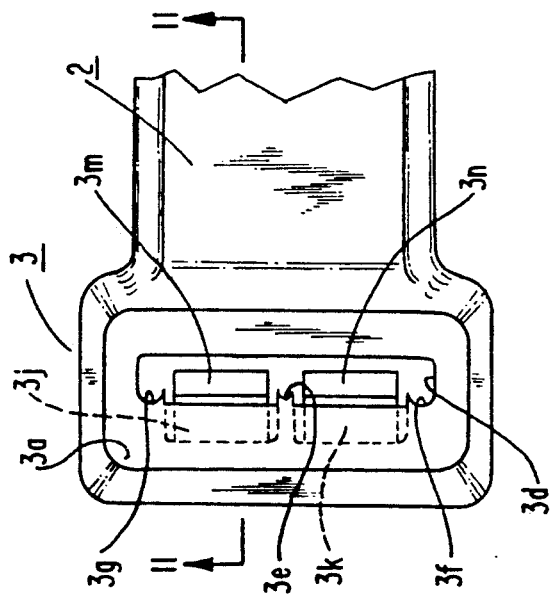
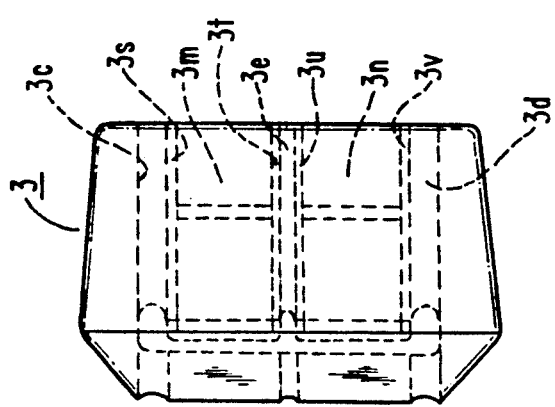
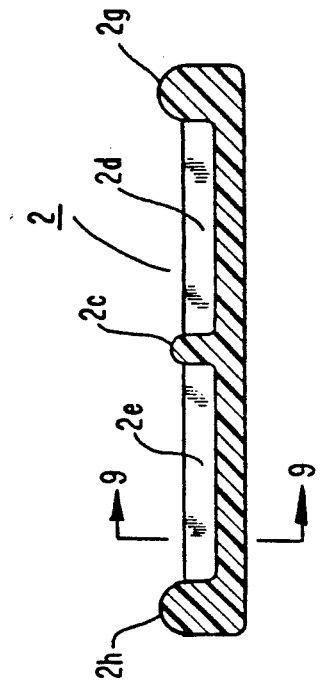
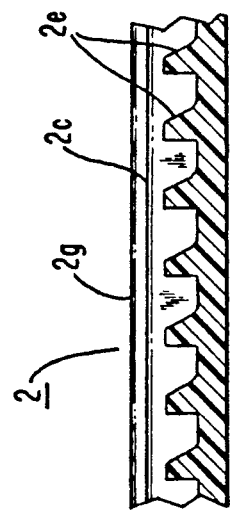

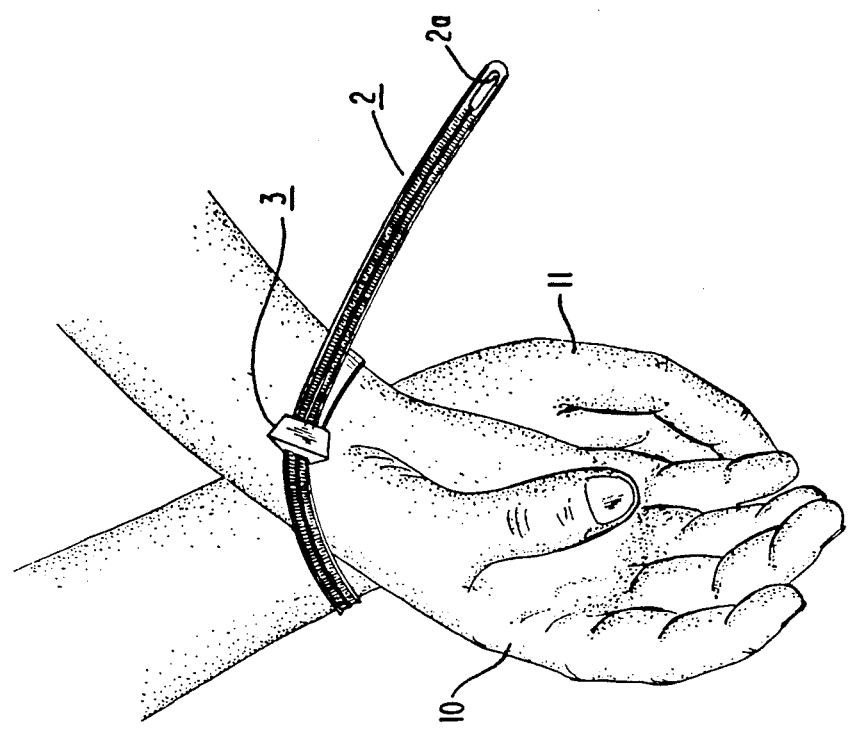
FIG. 13
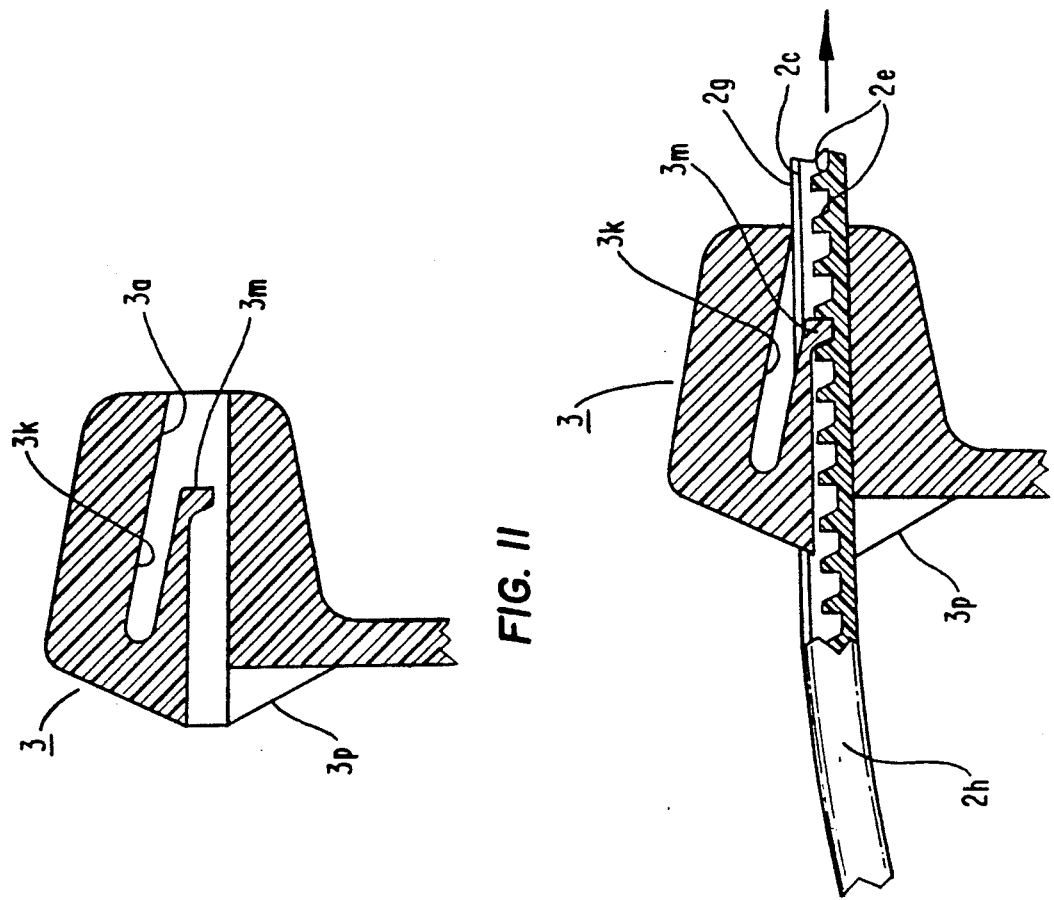
FIG. 11
FIG. 12

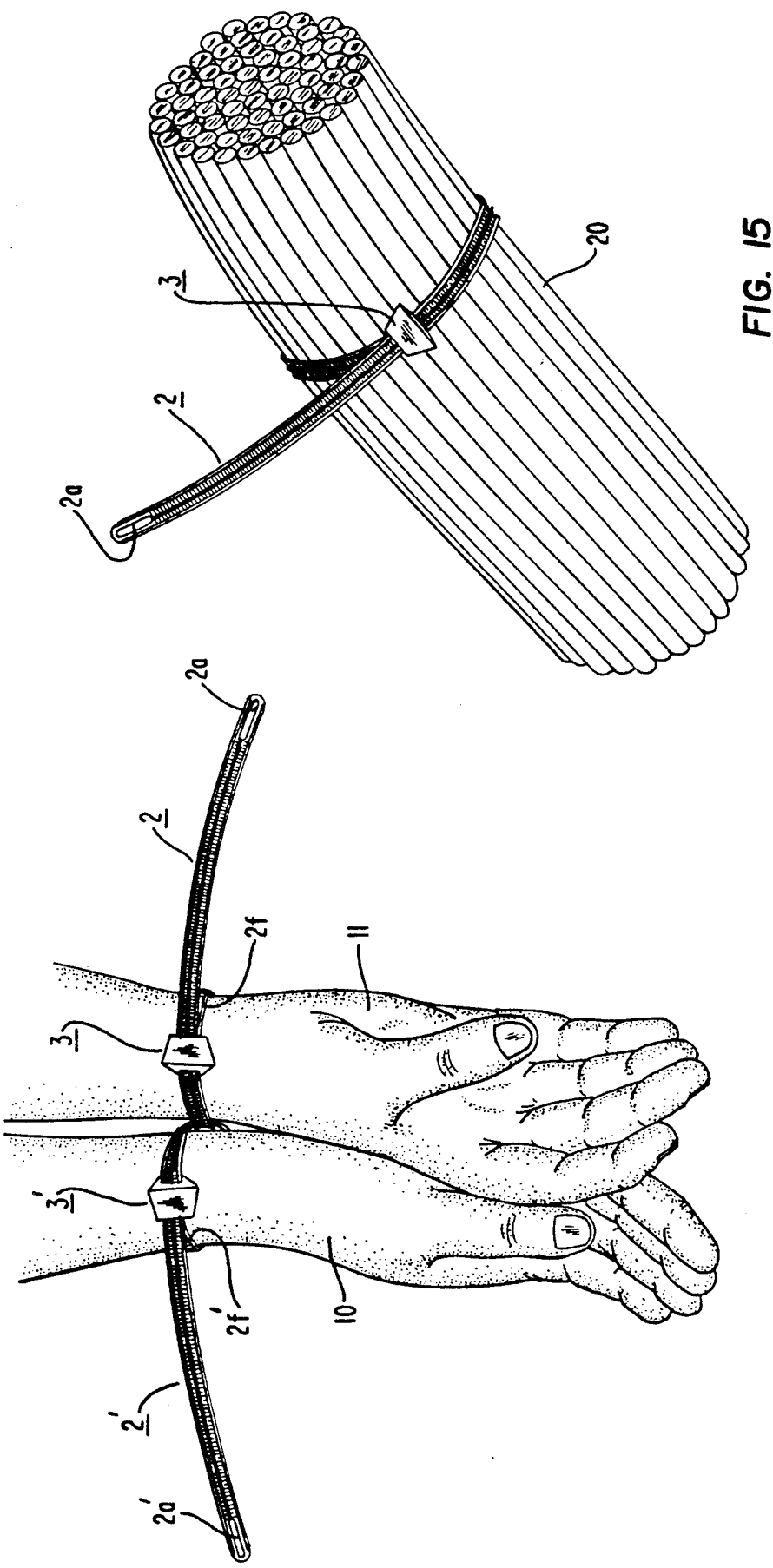

VERSATILE SELF-CLINCHING DISPOSABLE RESTRAINTS AND BUNDLING STRAPS

This application is a continuation of application Ser. No. 07/754,056 filed Sep. 3, 1991, abandoned.

This relates in general to combination plastic straps and locking heads used as versatile disposable restraints and bundling straps. More particularly, it relates to a self-clinching disposable plastic strap terminating in a locking head into which the tip of the tape is inserted and pulled through for locking in place.

BACKGROUND OF THE INVENTION

Law enforcement personnel normally carry only one set of metal handcuffs of the prior-art type, thus limiting further apprehensions, once the set of handcuffs has been used. In mass arrest situations, there are, thus, an insufficient number of restraining devices to be used in making arrests. On such a situation, it is necessary to identify the arresting officer in order to complete the arrest of the detainee. In addition, not all handcuffs can be opened with the same key; thus, the arresting officer is required to accompany the detainee to the place of detainment.

Prior art handcuffs are designed to be used on the wrists of the detainee. Accordingly, there is no protection to prevent the arresting officer from being kicked by the detainee as the officer normally carries no restraints for that purpose. The conventional type of metal handcuffs may be used as weapons against the arresting officer, and are, thus, extremely dangerous when being removed. Accordingly, it has been found convenient to substitute disposable restraints made of plastic or the like which must be cut off.

However, disposable restraints of the types available in the prior art have been found to have various drawbacks. For example, many of these disposable types are of such a design that their tips are easily inserted in the wrong direction by mistake, so that they are readily removable by the detainee with very little effort. Other disposable types may require a high insertion force or inadequate tip portion, making them difficult for the arresting officer to use. Furthermore, in others of the disposable types, the bore opening of the locking head is easily accessible to the detainee to be picked and opened. Others are of such materials and design that they may not be readily marked for identification. Other types have a narrow width and some have serrations on the underside which comes in contact with the skin of the detainee, making them inhuman to the detainee.

SHORT DESCRIPTION OF THE INVENTION

It is, therefore, the principal object of the present invention to provide an improved disposable restraining device of plastic or the like which may be securely locked into place on the wrists or ankles of the detainee. More particular objects of the invention are to provide a disposable restraining device of a design which is not accessible to being picked and unlocked by the detainee. Another object of the invention is to provide a disposable restraining device which is locked onto the detainee with a minimum effort by the arresting officer, and in which the tip cannot be inserted into the head in the wrong direction, and which is not accessible for picking by the detainee to allow his escape. Another object is to provide a disposable restraint which is easily marked for identification, and which is not inhuman to the detainee.

These and other objects are achieved by the versatile disposable, flexible restraint and bundling strap of the present invention which comprises an elongated tape at least about ⅝ inches (15.87 mm.) wide (which is smooth on the under surface and is serrated on the upper surface) with two parallel tracks of ratchet-shaped inwardly-directed teeth separated by a longitudinally-extending central rib and bound on opposite edges by matching ribs. One end of the tape terminates in a finger-hold comprising an elliptical loop, say about 1¼ inches (31.75 mm.) long and extending ⅜ (9.52 mm.) across the width of the tape between the two lateral ribs. The other end of the tape terminates in a solid block-shaped head having a primary bore which extends through the length direction of the tape, the width of the opening just exceeding the width of the tape. The dimensions of the primary bore opening perpendicular to the length of the tape is about one-third of the basic thickness of the tape at the plane of the head where the tip of the tape exits the head. At the other end, the primary bore dimension is perpendicular to the surface of the tape which slightly exceeds the thickness of the primary edge rib. The internal portion of the bore is hollowed out to provide secondary bores leading in from the tape exit end of the primary bore at acute angles, and forming on each side of the central rib a downwardly projecting cantilever pawl. Thus, the opening between the body of the strap and the opening in the head being at the apeces of the angles is so small that it makes it extremely difficult for the lock to be picked. The reason for the two pawls is to make it doubly difficult to be picked. The end of the tape is fastened to the lower inside face of the head in such a manner that the serrated surface of the tape is directed upwardly when the tip of the tape is interposed into the bore, thus permitting the twin cantilever pawls to engage the two rows of teeth in ratchet fashion. This prevents the tape from being pulled backwards through the acute angular opening and to be released once the tip of the tape has been pulled through the bore.

A shroud or skirt depends from the exterior of the head near the entrance position here the tape is drawn through the primary bore, to prevent the detainee from supporting the head in an attempt to release it. A clear area devoid of teeth is provided on the upper surface of the tape beyond the portion of the tape designed to be pulled through and locked in the head for cuffing a detainee. The clear space is provided for marking the tape to identify the detainee and/or the arresting officer.

It is apparent that many flexible disposable restraining tapes of a type described may be carried on the person of a single officer, and can be used as wrist or ankle cuffs for one or a number of detainees in making most arrests.

It is contemplated that a similar flexible tape with locking head is useful for many purposes, such as for wrapping and securing a bundle of cables or similar objects, or for securing electrical circuit elements in place. In such case, in which there is no danger of the lock being picked, the head is formed without the addition of a shroud. Likewise, the clear surface may be omitted from the surface of the tape if there is no need for written identification on the tape.

Other objects, features and advantages of the invention will be apparent from the drawings and the detailed description hereinafter.

SHORT DESCRIPTION OF THE DRAWINGS

FIG. 6 is a fragmentary rear view of the head of FIGS. 3A and 3B, with the internal portions of the bore being indicated by dotted lines.

FIG. 7 is a fragmentary view from the top of the head of FIGS. 3A and 3B.

FIG. 8 is a vie from the underside of the front of the head of the tapes of FIGS. 3A and 3B showing the inwardly projecting cantilever pawls forming acute angles with the primary bore for engaging the ratchet teeth on the surface of the tape.

FIG. 9 is a longitudinal fragmentary section of the tape along the plane indicated by the arrows 9—9 of FIG. 10 showing the outline of the ratchet-like teeth.

FIG. 10 is a width section of the tape along the plane indicated by the arrows 10—10 of FIG. 3A.

FIG. 11 is a fragmentary section through the plane of the head indicated by the arrows 11—11 of FIG. 7 showing the shape of the twin pawls projecting from the upper surface of the primary bore and forming an acute angle therewith.

FIG. 12 is a fragmentary section of the head indicated by arrows 12—12 o FIG. 2, showing the outline of the twin pawls engaging the ratchet teeth on the surface of the tape.

FIG. 13 shows a tape of the form of FIG. 3A wrapped about the wrists of a detainee.

FIG. 14 shows a pair of interlocked tapes of the form of FIG. 3A wrapped about the wrists of both hands of a detainee.

FIG. 15 shows a tape of the form of FIG. 3B wrapped about a bundle of cables.

DETAILED DESCRIPTION OF THE INVENTION

Figure 1:
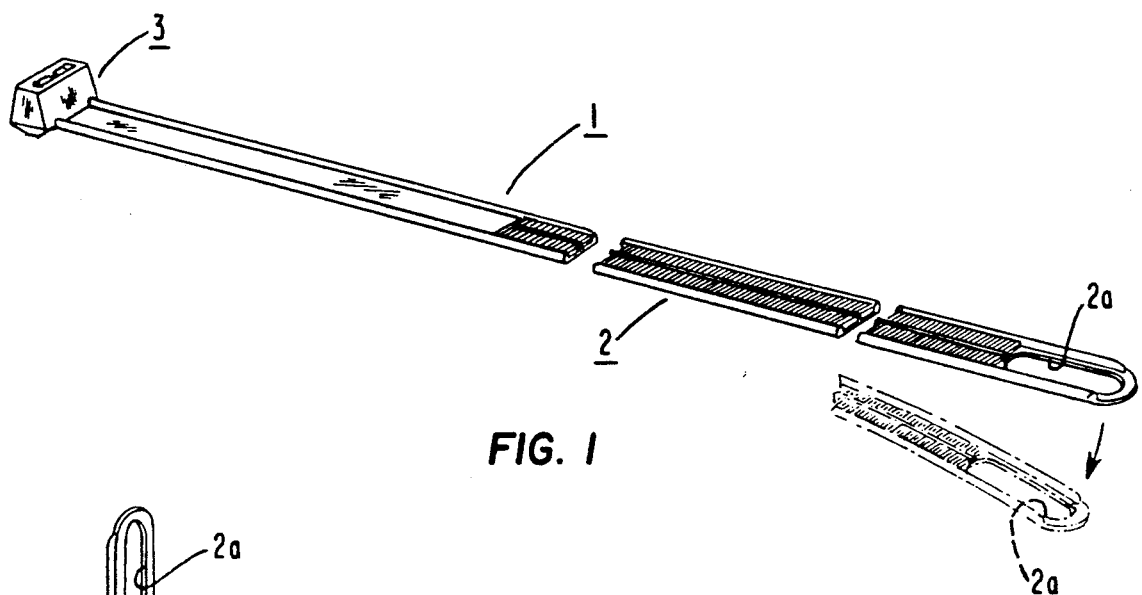
FIG. 1 is a perspective showing of the flexible restraining tape of my invention, lying flat, with the serrated side facing up.
Figure 2:
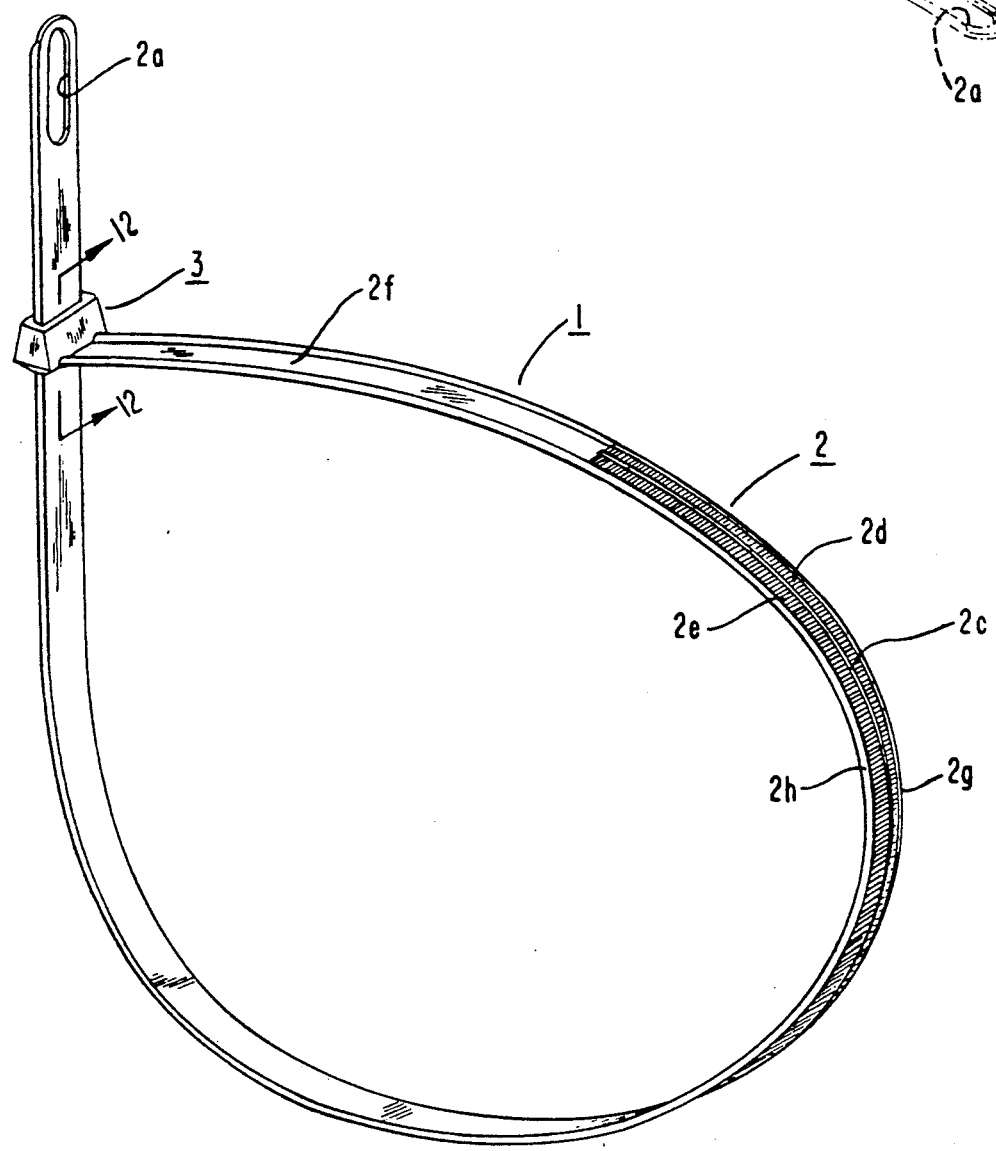
FIG. 2 is a perspective showing of the tape of FIG. 1 with the tip inserted and being pulled through a bore in the head to secure the tape in locked position for restraining the arms or legs of a detainee.

A typical example of a self-clinching disposable flexible restraint 1 in accordance with the present invention is shown extended flat, in FIG. 1, and placed in wrap-around position in FIG. 2. The enlarged detail of the tape 2 is shown flat in FIG. 3A, and in edgewise and bottom view in FIGS. 4 and 5, respectively, of the drawings.

In the typical example described, the tape may be formed of any flexible thermoplastic materials. For the presently described embodiment, a preferred material is nylon, plastic material having a tensile strength within the range of 8000 to 15,000 pounds per square inch (562.4 to 1054.5 Kg./cm.$^2$), dry as molded at a temperature of 73 degrees Fahrenheit (22.77 degrees C.) having a flexural modulus within the range 175,000 to 550,000 pounds per square inch (1,2302.5 to 38,665.0 Kg./cm.$^2$), and a typical Izod impact strength of one foot-pound per inch (175.1268 newtons/meter) and typical elongation at break of 60%, and elongation at yield of 5%.

Other materials which may be useful for the purposes of the present invention are: polyetherketone, polyetherimide, poly(amide-imide), polystyrene medium and high impact, polyvinylchloride, polypropylene, polyphthalate, carbonate and polyarylsulfone.

In the example of the flexible restraint 1, which will be described in detail by way of example, the tape 2 is, say, 22 inches (55.88 cm.) long, 0.656 inch (16.66 mm.) wide, and 0.032 inch (0.81 mm.) thick through its base layer. The upper face of the tape 1 of the present example has ribs 2g, 2h running the length of its opposite edges which are 0.062 inch (1.57 mm.) wide and extend 0.071 inch (1.80 mm.) above the inside surface, being rounded on the tops. Running the length of the center of the tape on its inside surface is a third rib 2c which is 0.032 inch (0.81 mm.) wide and 0.088 inch (2.23 mm.) thick and rounded at the top.

Extending along the length of the tape 2 between the ribs 2g and 2c on one side, and between ribs 2c and 2h on the other side, with the exception of the clear space 2f, are series of inwardly directed ratchet teeth forming tracks 2d and 2e, which are an important feature of this invention, which will be described in detail.

FIG. 9 is a fragment showing a longitudinal section of the tracks 2d, 2e; through the plane 9—9 of FIG. 10 and FIG. 10 shows a cross-section through the lane 10—10 of FIG. 9.

Each of the ratchet teeth of the series 2d, 2e is shaped as shown in the fragment of FIG. 9, projecting 0.04 inch (1.016 mm.) above the inside surface of the tape, and directed inwardly, forming on one surface an angle of 27 degrees with the normal to the surface and on the opposite side being normal to the surface. The dimension in a longitudinal direction of the tape of each of the teeth of the series 2d, 2e is 0.02 inch (0.508 mm.) across the top, which forms a truncated triangle, and 0.04 inch (1.016 mm.) across the bottom, ending an abutment normal to the tape surface. The normal abutments of the upwardly projecting teeth are spaced apart 0.078 inch (1.98 mm.).

Figure 3A:
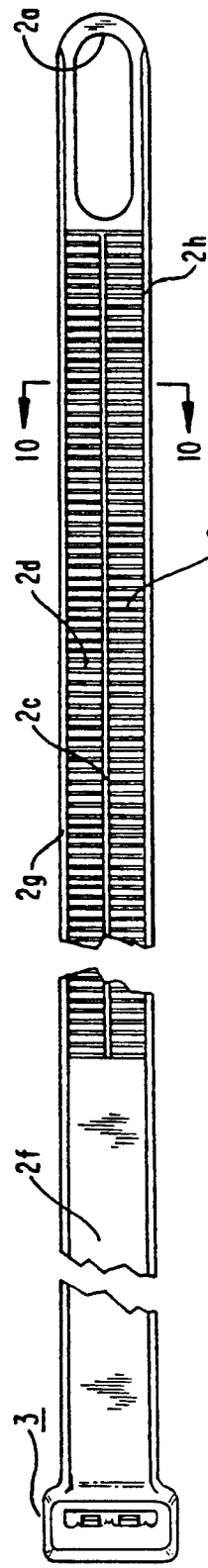
FIG. 3A is a top view of the tape of FIGS. 1 and 2 for restraining detainees, in which the upper surface is serrated with ratchet-like teeth with a smooth area left for identification.

In the embodiment of FIG. 3A, the ratchet teeth shown in section in FIGS. 9 and 10 extend the length of the tape 2 with the exception of the portion 2, which is left clear of teeth on the upper surface of tape 2, for a length, say, up to 5 inches (12.7 cm.) immediately behind the head portion 3. The purpose of this blank space is to provide an area suitable for written identification on the surface of the tape which may, for example, permit the arresting officer to identify himself and the name of the detainee.

Figure 3B:
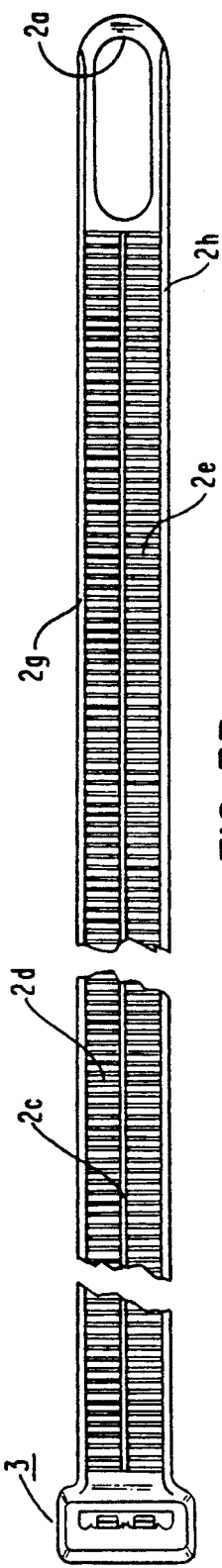
FIG. 3B is a top view of a modification of the tape of FIG. 3A, for use in building cables, and other electrical uses in which the entire upper surface in from the tip is serrated with the ratchet-like teeth.
Figure 5:
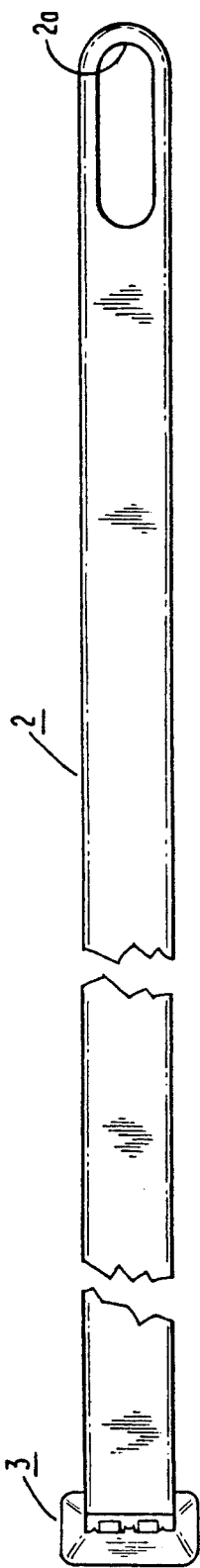
FIG. 5 is a bottom view of the tapes of FIGS. 3A and 3B.

In the tape shown in FIG. 3B, if there is no need for identification of the bundle to be secured, the rows of ratchet teeth 2d and 2e are extend for the entire length of the tape 2, so that bundles of small as well as large sizes can be secured by the self-clinching bundling strap. Otherwise, the structure and operation of the straps shown in FIGS. 3A and 3B is substantially identical. In both of the tapes shown in FIGS. 3A and 3B the outer side of the tape is plane, as shown in FIG. 5.

FIGS. 6, 7 and 8 are enlarged, fragmentary showings of the head portion of the tapes of FIGS. 1-5.

FIG. 6 is a perspective showing of the head 3 which is at one terminal of the tape 2. The head 3 is molded of the same material as the tape 2, to one end of which it is integrally attached, being centered at the base of the entrance face of the head 3. The entrance face 3a of the head 3 may, for example, be rectangular, 0.960 inch (24.38 mm.) wide in the direction of the width of tape 2, and 0.5 inch (12.7 mm.) in a direction normal to the surface of the entering tape. Centered in the entering face 3a is a primary bore 3d which passes completely through the head in the direction of travel of the tape and which is shaped to just accommodate the thickness of the entering tape 2. Primary bore 3d has a central semicylindrical groove 3e passing through the thickness of the head which is of such a dimension normal to its surface above the floor of the slot 3d and designed to have such a radius of curvature that it just accommodates the central rib 2c of the tape 2 passing through the head. Likewise, the lateral grooves 3f and 3g, which pass through the thickness of the head, are shaped to just accommodate the lateral ribs 2g and 2h.

Pulled internally, between the lateral groove 3g and the central groove 3e, and the lateral groove 3h and the central groove 3e, on opposite sides, are respectively disposed a separate pair of grooves 3j and 3k each 0.05 inch (1.27 mm.) in thickness, which extend 0.45 inch (11.43 mm.) through the thickness of the head 3 forming secondary bores making angles of 11 degrees with the principal axis of the primary grooves 3f and 3g, and terminating internally in a pair of jaw-like cantilever pawls having terminals 3m and 3n. (See FIGS. 11 and 12).

The cantilever arms terminating in pawls 3m and 3n are spaced apart from the walls of the internal bore by tolerances 3s, 3t, 3u and 3v of approximately 0.02 inch (0.51 mm.) to enable the pawls to move independently of each other without striking. In preferred form the tolerances should not exceed about 0.03 inch (0.76 mm.). (See FIG. 6) The terminals 3n and 3m are shaped to exactly fit into and engage the spaces between the ratched teeth 2d and 2e in such a manner that when the tape 2 is moved through the head 2 in the direction indicated by the arrow in FIG. 12, the tape can only move forward and never in a reverse direction, because of the well-known operation of the ratchet and pawl and because of the fact that pawls are directed at an acute angle to the primary bore.

Figure 4:
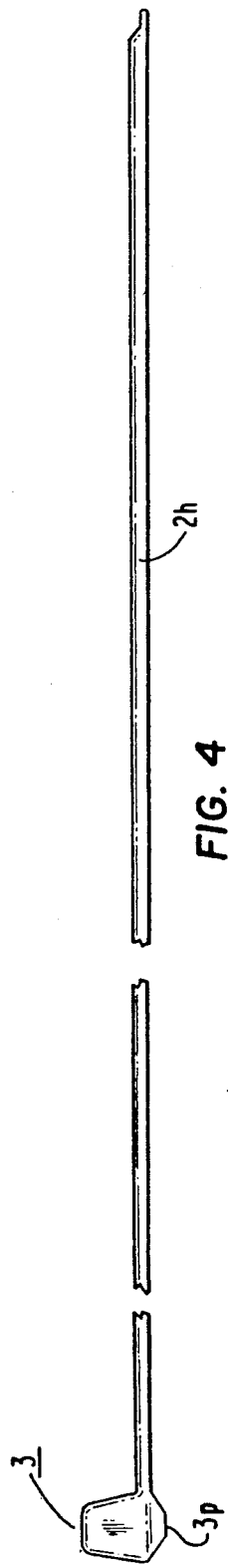
FIG. 4 is an edge-elevational view of the tapes of FIGS. 3A and 3B.

In the embodiment of FIG. 4, a shroud 3p, which is a plastic skirt forming an angle of 29 degrees with the outer surface of the tape 2 at its lines of connection with the head 3, extends in triangular fashion to cover the entrance to the primary bore 3a, thereby preventing the detainee from supporting the head in attempting to release the lock. This piece 3p may be eliminated from the alternative tape design shown in FIG. 3B.

FIG. 13 shows how a single tape 2 of the form shown in FIG. 3A is locked about the wrists of a pair of hands 10 and 11 of a typical detainee. FIG. 14 shows how a pair of tapes of the type shown in FIG. 3A can be interlocked about the hands 10 and 11 of a detainee. In a similar manner, tapes can be secured about the ankles of a detainee.

FIG. 15 shows an alternative use of a tape of the type shown in FIG. 3B to secure a bundle of cables.

It will be understood that the invention is not limited to the specific forms and dimensions and applications shown herein by way of example, but only by the scope of the attached claims.

What I claim is:

1. A self-containing flexible tape of plastic or the like which comprises in combination:

an elongated tape portion having a pair of lateral ribs and a central rib each extending in a length direction along one surface of said tape, said tape including a principal axis along the length thereof;

two parallel series of ratchet teeth projecting upward from said one surface of said tape on opposite sides of said central rib along a length of said tape; said ratchet teeth having a perpendicular axis normal to said principal axis, said ratchet teeth including a front surface forming an acute angle with said perpendicular axis and a rear surface parallel to said perpendicular axis, a space formed between said front surface of a first one of said ratchet teeth and said rear surface of an adjacent one of said ratchet teeth;

said tape terminating at one end in a tip and at the other end in clinching means comprising a head formed integrally with said other end and having a primary bore and a secondary channel intersecting at an acute angle, said primary bore passing clear through said head in a direction which is substantially normal to said principal axis of said tape;

said head having a tape entrance face and a tape exit face, said tape entrance face disposed at a position adjacent said acute angle, the cross-section of said primary bore at said tape entrance face being shaped to just accommodate the thickness of said tape including said central rib and said lateral ribs;

said intersecting primary bore and secondary channel forming internal walls and an internal roof;

a pair of cantilever pawls disposed on opposite sides of said central rib and depending from said inner roof at positions spaced internally between said entrance face and said exit face; and each of said cantilever pawls having a tip which is designed to successively engage each of said parallel series of said ratchet teeth as said tape is pulled in a forward direction through said intersecting primary bore and secondary channel which are angularly shaped to exactly fit said ratchet teeth and oppose movement of said tape in a reverse direction in said primary bore, thereby forming a lock between said tape and said head in a preselected position in said primary bore.

2. The combination in accordance with claim 1 wherein the tip of said tape has a finger hold opening for grasping said tape.

3. The combination in accordance with claim 2 wherein said two series of ratchet teeth extend the entire length of said tape portion, with the exception of said finger hold opening.

4. The combination in accordance with claim 1 wherein a skirt is appended to said head below the entrance face of said head for protecting the opening of said primary bore from the picking or supporting of said lock by a detainee.

5. The combination in accordance with claim 1 in which the inner surface of said tape is smooth, and the outer surface of said tape is provided with a smooth surface for several inches between said head and the toothed portion of said tape for identification.

6. A self-clinching flexible tape of plastic or the like in accordance with claim 1 whereby the cross-section of said primary bore at said tape entrance face is shaped so that the tolerance between the internal wall of said bore and the surface of said tape including said central rib and said lateral ribs does not exceed about 0.03 inch (0.76 mm.).

7. The tape in accordance with claim 1 wherein said first and second series of ratchet teeth form a truncated triangle.

8. A self-clinching flexible tape comprising:
an elongated tape portion, said elongated tape including a central rib and a principal axis extending along the length of said tape;
a first and second parallel series of inwardly directed ratchet teeth projecting upward from a first surface of said tape on opposite sides of said central rib, said ratchet teeth including a perpendicular axis normal to said principal axis;
a front surface of said ratchet teeth forming an acute angle with said perpendicular axis;
a rear surface of said ratchet teeth being parallel to said perpendicular axis, a space formed between said front surface of a first one of said ratchet teeth and said rear surface of an adjacent one of said ratchet teeth;
a head having a primary bore for receiving said tape passing through said head in a direction which is substantially normal to said principal axis of said tape;
a pair of cantilever pawls disposed on opposite sides of said central rib; each of said cantilever pawls having a tip which is shaped to exactly fit into said space and successively engage each of said parallel series of said ratchet teeth as said tape is pulled in a forward direction through said primary bore and to oppose movement of said tape in a reverse direction, thereby forming a lock between said tape and said head in a preselected position in said bore.

* * * * *